(12) United States Patent
Deng et al.

(10) Patent No.: US 8,983,057 B1
(45) Date of Patent: Mar. 17, 2015

(54) STEP SIZE CONTROL FOR ACOUSTIC ECHO CANCELLATION

(71) Applicant: Amazon Technologies, Inc., Reno, NV (US)

(72) Inventors: Hongyang Deng, San Jose, CA (US); Amit Singh Chhetri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/033,253

(22) Filed: Sep. 20, 2013

(51) Int. Cl.
*H04M 9/08* (2006.01)

(52) U.S. Cl.
CPC ..................................... *H04M 9/082* (2013.01)
USPC .................................. 379/406.06; 379/406.08

(58) Field of Classification Search
USPC ......................................... 379/406.06, 406.08
See application file for complete search history.

(56) References Cited

U.S. PATENT DOCUMENTS

| 2004/0001450 A1* | 1/2004 | He et al. .......................... 370/286 |
| 2010/0057454 A1* | 3/2010 | Mohammad et al. ......... 704/233 |

* cited by examiner

*Primary Examiner* — Alexander Jamal (74) *Attorney, Agent, or Firm* — Knobbe Martens Olson & Bear LLP (57) ABSTRACT

A step size controller may be used to control the rate of adaptation in an acoustic echo canceller. Step size control based on the values of adaptive coefficients (rather than, e.g., a fixed initial adaptation period) provides improved reliability and resistance to disruption. Accordingly, features are disclosed for controlling step size based on the values of adaptive coefficients.

20 Claims, 4 Drawing Sheets

STEP SIZE CONTROL FOR ACOUSTIC ECHO CANCELLATION

BACKGROUND

A device for bi-directional audio-based communication typically includes both a loudspeaker and a microphone. The loudspeaker is used to play back audio signals received from a remote ("far-end") source, while the microphone is used to capture audio signals from a local ("near-end") source. In the case of a telephone call, for example, the near- and far-end sources may be people engaged in a conversation, and the audio signals may contain speech. An acoustic echo occurs when the far-end signal emitted by the loudspeaker is captured by the microphone, after undergoing reflections in the local environment.

An acoustic echo canceller (AEC) may be used to remove acoustic echo from an audio signal captured by a microphone, in order to facilitate improved communication. The AEC typically filters the microphone signal by determining an estimate of the acoustic echo, and subtracting the estimate from the microphone signal to produce an approximation of the true near-end signal. The estimate is obtained by applying a transformation to the far-end signal emitted from the loudspeaker. The transformation is implemented using an adaptive algorithm such as least mean squares, normalized least mean squares, or their variants, which are known to persons of ordinary skill in the art.

The adaptive transformation relies on a feedback loop, which continuously adjusts a set of coefficients that are used to calculate the estimated echo from the far-end signal. Different environments produce different acoustic echoes from the same loudspeaker signal, and any change in the local environment may change the way that echoes are produced. By using a feedback loop to continuously adjust the coefficients, an AEC can adapt its echo estimates to the local environment in which it operates.

While adaptation generally improves the echo estimates produced by an AEC, this is not always true. The feedback-based adaptation scheme works better in some situations than in others, so it may be beneficial to increase or decrease the rate of adaptation in different situations. The rate of adaptation may be controlled by adjusting a parameter referred to as "step size." A larger step size will increase the rate of adaptation, and a smaller step size will decrease it.

When adaptation is first initiated, a relatively large step size is desirable because it will allow the AEC coefficients to quickly converge on a good approximation of the actual echo produced by the local environment. Once the AEC has converged, however, a smaller step size may be more desirable. With a smaller step size, any adjustments to the AEC coefficients will be less abrupt, and the feedback loop will therefore be less susceptible to disruptive inputs like background noise and double talk, which occurs when the far-end signal and the near-end signal are both simultaneously active.

Existing step size control schemes assume that the AEC will converge within a fixed period after system initialization. Accordingly, they employ a large step size during the fixed period and a smaller step size thereafter. However, convergence may occur after or substantially before the end of the fixed period, causing poor AEC performance in some circumstances.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure relates to achieving robust acoustic echo cancellation in a variety of circumstances. This is accomplished by relying on a step size controller that is capable of effectively determining when convergence has occurred in an AEC system. This capability may be achieved by monitoring certain relationships between the adaptive coefficients used by the system. Further explanation is provided below, with reference to accompanying figures.

Figure 1:
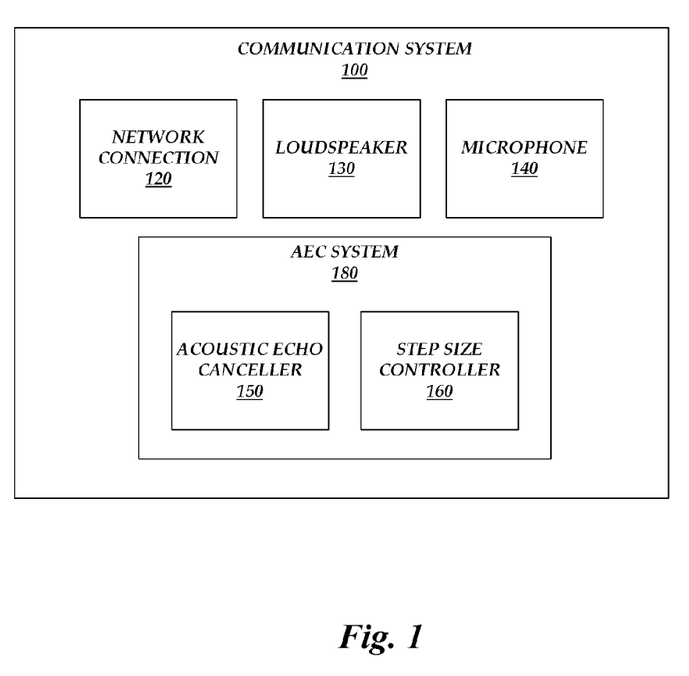
FIG. 1 is a block diagram illustrating components of some communication systems that include acoustic echo cancellers with step size controllers.

FIG. 1 shows an example of a communication system 100. Communication system 100 may be implemented in hardware and/or software using techniques known to persons of skill in the art. For example, communication system 100 may be implemented by a single telecommunication device, such as a mobile phone, or by a combination of several devices such as a mobile computing device and a network-accessible server.

FIG. 1 shows components that may appear in communication system 100, including a network connection 120, a loudspeaker 130, a microphone 140, and an AEC system 180. AEC system 180 includes an acoustic echo canceller 150, and a step size controller 160.

Network connection 120 may be used to send and receive communication signals over a network. The network may be any wired network, wireless network, or combination thereof. In addition, the network may be a personal area network, local area network, wide area network, cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate intranet. The network may include one or more wireless networks, such as a Wi-Fi network, a Global System for Mobile Communications (GSM) network, a Code Division Multiple Access (CDMA) network, a Long Term Evolution (LTE) network, or some other type of wireless network. Secured protocols such as Hypertext Transfer Protocol Secure (HTTPS) may be used to secure communications across the network, e.g., by encryption. Protocols and components for communicating via the Internet or any of the other aforementioned types of networks are well known to those skilled in the art of computer communications and thus, need not be described in more detail herein.

The communication signals that are sent and received by network connection 120 may include a far-end signal, which may be emitted from loudspeaker 130, and an AEC output signal, produced by acoustic echo canceller 150. The AEC output signal may be determined by adaptively filtering a signal from microphone 140. For the sake of simplicity, microphone 140 is referred to herein as a single component. However, in some embodiments, multiple microphones may be used together and an AEC system (or portions of an AEC system) may be provided for each one. Within AEC system 180, step size controller 160 may determine step sizes on a continuous basis to control the rate of adaptation in acoustic echo canceller 150. Additional aspects of AEC system 180 are described below, with respect to FIGS. 2, 3A, 3B, and 4.

Figure 2:
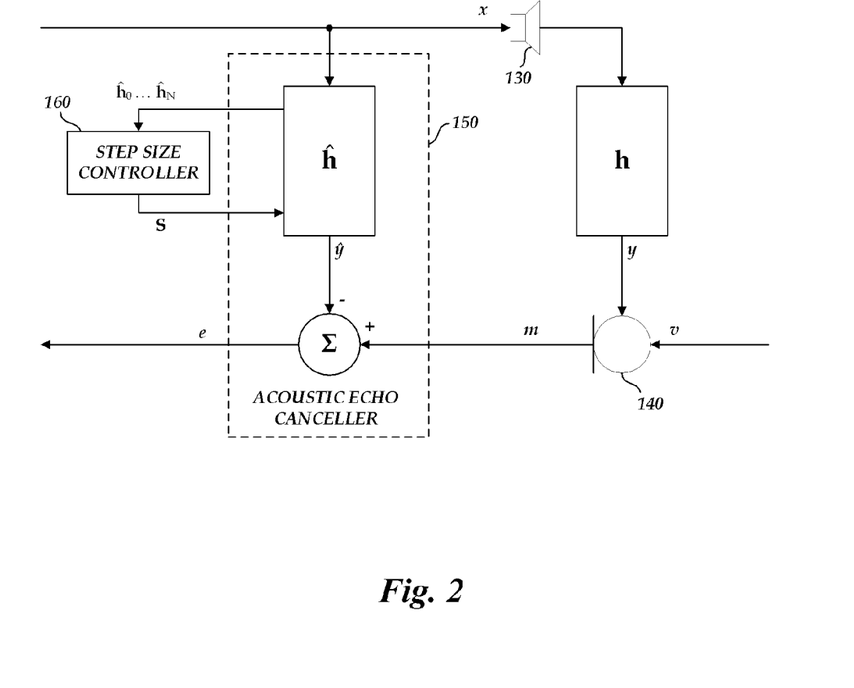
FIG. 2 is a signal diagram depicting the relationships between various signals that are used to perform acoustic echo cancellation in accordance with the present disclosure.

FIG. 2 is a signal diagram that illustrates the relationships between various signals and components that are relevant to acoustic echo cancellation. Certain components of FIG. 2 correspond to components from FIG. 1, and retain the same numbering. These components include loudspeaker 130, microphone 140, acoustic echo canceller 150, and step size controller 160. The signals depicted in FIG. 2 include far-end signal x, acoustic echo y, near-end signal υ, microphone signal m, estimated echo ŷ, and AEC output e. FIG. 2 also depicts acoustic transfer function h and estimated acoustic transfer function ĥ, along with particular coefficients of the estimated transfer function, $\hat{h}_0 \ldots \hat{h}_N$, and step size S.

In the example of FIG. 2, acoustic echo may occur as follows. Far-end signal x is emitted from loudspeaker 130 and undergoes various reflections in the local environment according to acoustic transfer function h, yielding acoustic echo y. Microphone 140 captures both acoustic echo y and near-end signal v, which together produce microphone signal m. The presence of acoustic echo y in microphone signal m may interfere with the recognition of near-end signal v by a listener, thereby hindering communication. Accordingly, it may be desirable to filter microphone signal m in order to remove acoustic echo y, to the extent that such removal is possible.

AEC 150 may be configured to filter microphone signal m in the following manner. First, AEC 150 applies estimated transfer function h to far-end signal x, yielding estimated echo 9. Estimated echo 9 is subtracted from microphone signal m, producing AEC output e. AEC output e is an estimate of the near-end signal v, and if AEC 150 is functioning properly then the content of near-end signal v will be more easily discerned from AEC output e than from microphone signal m.

As described above, AEC 150 relies on estimated echo ŷ, which in turn relies on estimated transfer function ĥ. The estimation of transfer function ĥ may be adaptive. For example, the coefficients of the estimated transfer function may be adjusted automatically and continuously by a feedback loop. The rate of adaptation used in this feedback loop may depend on step size S. The value of step size S may be determined continuously by step size controller 160, using information derived from coefficients $\hat{h}_0 \ldots \hat{h}_N$ of the estimated transfer function. An example process for determining step size S based on coefficients $\hat{h}_0 \ldots \hat{h}_N$ is described in further detail below with regard to FIG. 4.

AEC 150 and step size controller 160 may process the signals on a frame-by-frame basis. Here, a frame represents a collection of discrete signal samples (in the correct sequence). In some embodiments, a frame is 8-10 milliseconds long. For each frame, AEC 150 adjusts the set adaptive coefficients using the present value of step size S. The adaptive coefficients are then sent to step size controller 160, and used to determine an updated value for step size S. The updated step size may then be used to adjust the adaptive coefficients for the next frame. In some embodiments, the values of the adaptive coefficients, the step size, or both may be determined on a sample-by-sample basis, rather than frame-by-frame.

Signal samples are indexed by discrete sample index n, with each sample representing the state of the signal at a particular point in time. Thus, for example, the signal e may be represented by a sequence of samples e(0), e(1), ... e(n). In this example the index n corresponds to the most recent point in time for which a sample is available. In addition, calculations involving various signals may be expressed using the sample index n. For example, the value of e at time n may be determined by the equation e(n)=m(n)−ŷ(n).

In some cases, the value of one signal at time n may depend on values of one or more other signals at several points in time. For example, the value of estimated echo ŷ depends on the value of the far-end signal x, as follows:

$$\hat{y}(n) = \hat{h}(n) * x(n),$$

where '*' denotes the convolution operation. The value of the estimated transfer function ĥ(n) at time n may be defined to depend on the value of the input signal at several points in time. Using x as the input signal, the value of the convolution of ĥ and x at time n may be calculated this way:

$$\hat{h}(n) * x(n) = \hat{h}_0(n)x(n) + \hat{h}_1(n)x(n-1) + \ldots + \hat{h}_L(n)x(n-L)$$

Combining the last two equations, it can be seen that the value of ŷ at time n depends on the value of x at times n, n−1, ..., n−L:

$$\hat{y}(n) = \hat{h}_0(n)x(n) + \hat{h}_1(n)x(n-1) + \ldots + \hat{h}_L(n)x(n-L)$$

Thus, the value of a particular signal at one point in time may be calculated from values of other signals at multiple points in time.

Note that in the foregoing example, the estimated transfer function ĥ is defined in part by a set of coefficients $\hat{h}_0, \hat{h}_1, \ldots, \hat{h}_L$. These are the adaptive coefficients of the AEC, which are adjusted continuously in order to make the estimated echo ŷ converge on the actual echo y. The calculation of ŷ depends on values of the far-end signal x at several different points in time because the actual echo y may be caused by reflections of x along multiple paths in the local environment. Some of these paths will be longer than others, and the time required for sound to traverse them will vary accordingly. The acoustic echo y that reaches the microphone at a particular time will therefore correspond to values of x from multiple points in time. The calculation of ŷ is designed to account for this fact, which is why ŷ(n) depends on x(n), x(n−1), ... x(n−L).

Note that the complete set of coefficients used by the estimated transfer function h includes coefficients indexed from 0 to L, but the set of coefficients used by step size controller 160 are indexed from 0 to N. The set of coefficients used by the step size controller may be smaller than the set used by the estimated transfer function, so N may be less than L. The parameter N is a tunable constant, discussed in further detail below with regard to FIG. 4.

The signals described above are illustrative, and an AEC system may include a variety of additional signals beyond those depicted in FIG. 2 without departing from the inventive concepts described herein. For example, step size controller 160 may use additional or different input signals apart from those depicted in FIG. 2 in order to perform the detection and control operations described below.

Figure 3A:
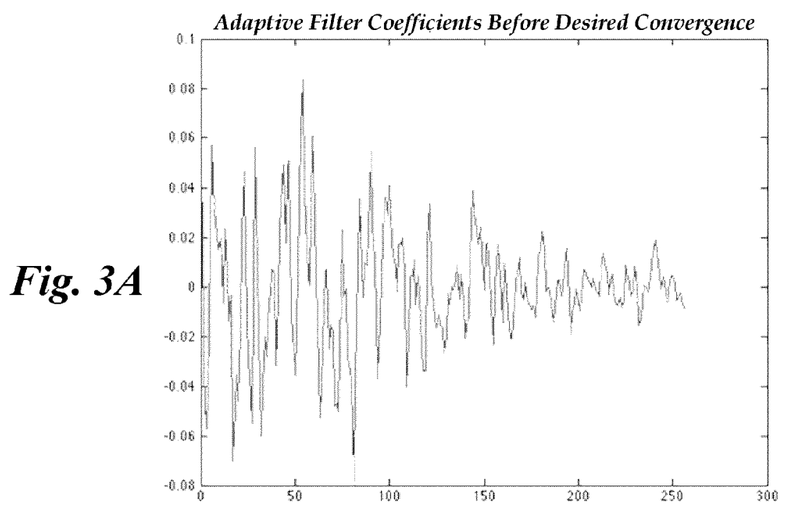
FIG. 3A is a graph depicting illustrative values of a set of AEC coefficients before convergence.
Figure 3B:
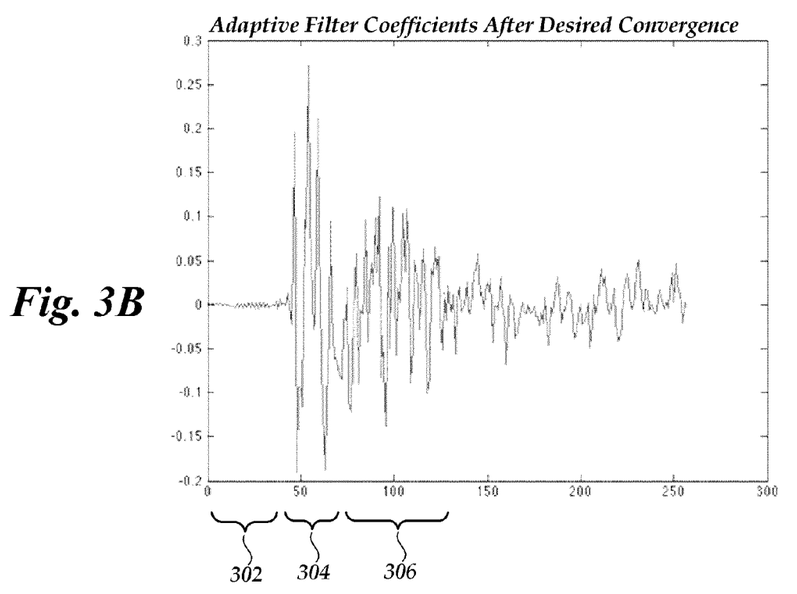
FIG. 3B is a graph depicting illustrative values of a set of AEC coefficients after convergence.

Turning now to FIGS. 3A and 3B, a set of graphs are provided to illustrate typical patterns that may be encountered among sets of AEC coefficients. FIG. 3A depicts the values of the AEC coefficients before a desired level of convergence is reached, and FIG. 3B depicts the values of the coefficients after such convergence. In both figures, the index of each coefficient is plotted against the horizontal axis and the value of each coefficient is plotted against the vertical axis.

Recall that calculations of estimated echo in an AEC depend on values of the far-end/loudspeaker signal at several different points in time. Sound emitted from the loudspeaker at a single point in time may follow different echo paths in the local environment, resulting in different echoes that are captured by microphone at multiple, later points in time. Conversely, the sound captured by the microphone at a single point in time may depend on multiple sounds that were previously emitted from the loudspeaker at different, earlier points in time. The use of multiple coefficients, each applied to successively older samples from the far-end signal, allows an AEC to effectively model the variations in actual echoes that are caused by different echo paths in the local environment.

Returning to FIGS. 3A and 3B, each graph depicts the value of 256 coefficients. These 256 coefficients may be applied, respectively, to the most recent 256 samples of the far-end signal in order to determine a current sample of the estimated echo signal. In many embodiments, more or fewer than 256 samples may be used to determine the estimated echo.

As explained earlier, effective step size control may rely on detection of AEC convergence using the values of adaptive coefficients. This detection may be accomplished by identifying features that are likely to be present in a set of coefficients only when an AEC has converged. Such features be discerned by comparing the pattern of coefficients in FIGS. 3A and 3B.

The converged coefficients in FIG. 3B may be divided into at least three groups, including group 302, group 304, and group 306. The distribution of coefficient values in each of these groups is typical of a converged AEC system. Relevant features of each distribution are explained below.

Consider the following scenario. Sound from a far-end signal may be emitted from a loudspeaker at an initial point in time. This sound travels out from the loudspeaker in various directions, reaching a microphone directly after a short period of time. In addition to the direct route, the sound may traverse various indirect routes through the local environment, reaching the microphone in successive stages after various longer periods of time.

Before the sound emitted from the loudspeaker reaches the microphone directly, no echo is captured. Accordingly, the coefficients in group 302 are near zero in magnitude. Once the sound traverses the direct path, a substantial echo will be captured by the microphone. As a result, the coefficients in group 304 are much larger in magnitude. Next, the sound that traversed the various indirect paths will reach the microphone, and additional echo will be captured. The loudness of this additional echo will be diminished in comparison to the sound captured directly, so the coefficients in group 306 are smaller in magnitude than those in group 304.

Comparing FIGS. 3A and 3B, it is apparent that the series of consecutive near-zero coefficients in group 302 is present only when the AEC system has converged. As a result, this feature of the converged system may provide a basis for effective step size control. As described above, this near-zero distribution of coefficients in group 302 is the result of delay between emission of sound at the loudspeaker and capture of the same sound at the microphone. This delay is present in a typical communications system due to the physical distance between the loudspeaker and the microphone. However, if a communications system does not exhibit a sufficient delay by virtue of the physical distance alone, additional delay can be introduced by buffering samples from the microphone signal or the far-end signal. In one example, a buffer may be used to introduce a delay in the far-end signal after it is provided to the AEC but before it is played through the loudspeaker. In another example, a buffer may be used to introduce a delay in the microphone signal after it is captured by the microphone but before it is provided to the AEC. In either case, from the perspective of the AEC, there will be an added delay between the occurrence of a particular sound in the far-end signal and the capture of a corresponding sound in microphone signal.

In some communications systems, the distance between the loudspeaker and the microphone may be variable. For example, a telephone designed for use in a large conference room may comprise a base station that includes a speaker, and a remote microphone that is configured to communicate with the base station. The remote microphone may be located at a variety of positions relative to the base station, depending on where it is placed by a user. Accordingly, the distance between the microphone and the base station may not be known when the telephone is being designed.

A communications system in which the distance between a loudspeaker and microphone is variable may include features for determining the delay introduced by such distance. For example, the delay may be estimated by measuring the cross-correlation between the loudspeaker signal and the microphone signal, or by playing a predetermined sound through the loudspeaker and measuring the time that elapses before the predetermined sound is captured by the microphone. Determining the relevant delay may enable effective detection of AEC convergence, providing a basis for controlling step size in the manner explained below.

Figure 4:
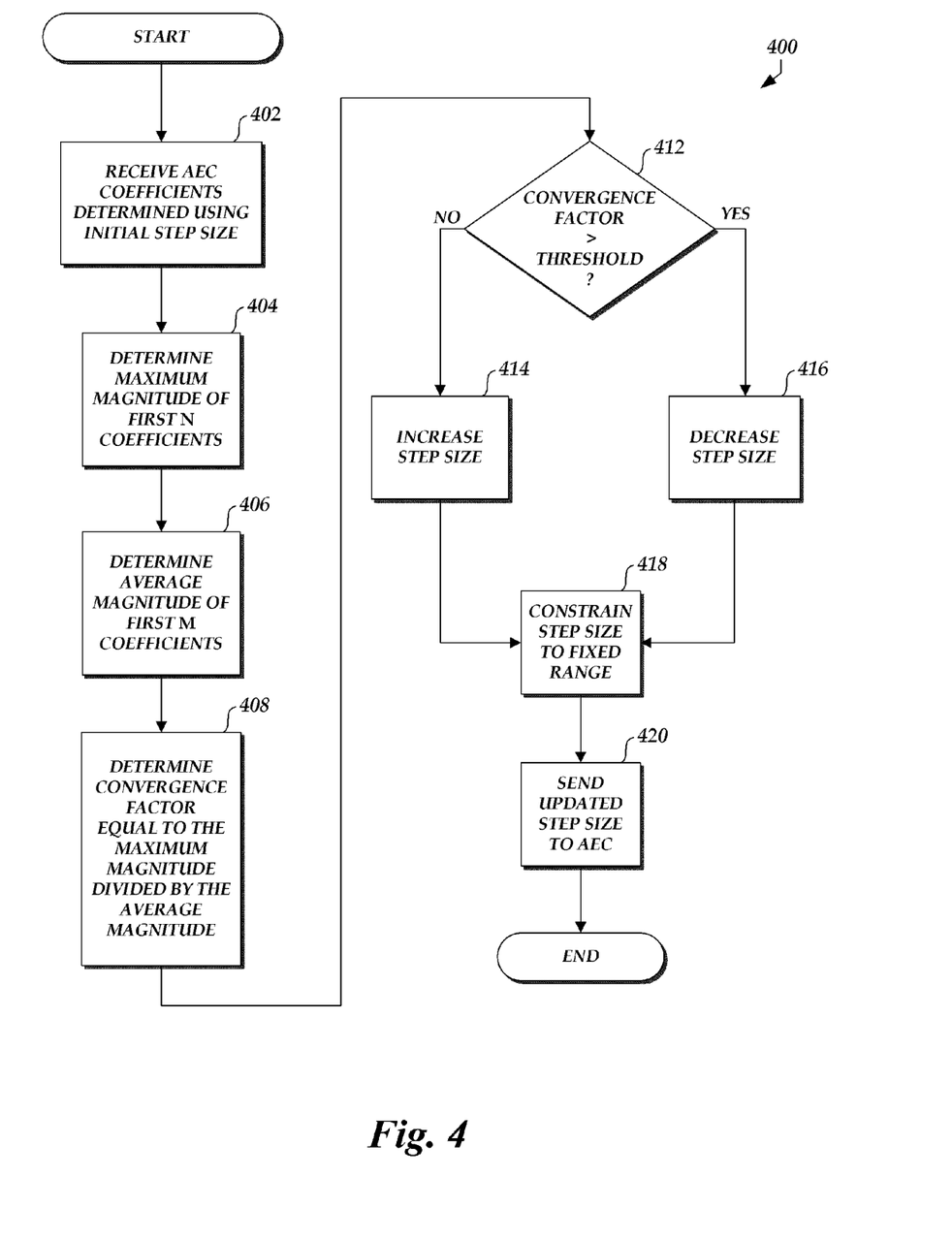
FIG. 4 is a flow diagram of an illustrative process for controlling step size in an AEC system based on a convergence factor determined from AEC coefficients.

Turning now to FIG. 4, an example process 400 is depicted for controlling step size based on the values of AEC coefficients. More specifically, process 400 controls the step size based on a convergence factor, which is sensitive to the near-zero coefficient distribution described above. In terms of the components shown in FIGS. 1 and 2, process 400 may be implemented by step size controller 160 using information obtained from AEC 150. Process 400 may be performed repeatedly, e.g., sample-by-sample or frame-by-frame.

Process 400 begins at block 402, where step size controller 160 receives a current set of coefficients from AEC 150. Generally, the current set of coefficients has been adapted from a previous set of coefficients using a step size determined by a previous iteration of process 400. With respect to the current iteration of process 400, this may be referred to as the initial step size.

After the coefficients are received at block 402, process 400 continues to block 404. At this block, step size controller 160 determines a first statistic. For example, the first statistic may be the maximum magnitude of the first N coefficients. That is:

$$\text{max-magnitude-first-}N = \max(|\hat{h}_0|, \ldots, |\hat{h}_N|)$$

As described earlier, N is a tunable parameter. For example, the value of N may be 128. Referring to FIG. 3B, notice that the first 128 coefficients would include groups 302, 304, and 306. The significance of this grouping is explained later.

Returning to FIG. 4, process 400 continues to block 406, where step size controller 160 determines a second statistic. For example the second statistic may be the average magnitude of the first M coefficients. That is:

$$\text{avg-magnitude-first-}M = \text{mean}(|\hat{h}_0|, \ldots, |\hat{h}_M|)$$

Here, M is a tunable parameter that is less than N. For example, the value of M may be 32. Referring to FIG. 3B, notice that the first 32 coefficients would include group 302 only. The significance of this grouping is explained below.

Referring again to FIG. 4, process 400 continues to block 408, where a convergence factor is determined. The convergence factor p may be given by:

$$p=(\text{max-magnitude-first-}N)/(\text{avg-magnitude-first-}M)$$

Larger values of the convergence factor p indicate that the AEC coefficients have converged. Using FIG. 3B as an example, p will be large when the maximum magnitude of coefficients in groups 302, 304, and 306 is substantially larger than the average magnitude of coefficients in group 302 only. Stated differently, p will be large, indicating convergence, when the average magnitude of coefficients in group 302 is substantially smaller than the maximum magnitude of coefficients in groups 302, 304, and 306. Thus, the convergence factor p grows when the coefficients in group 302 are smaller overall than those in groups 302, 304, and 306. In other words, the convergence factor p grows when the distribution of coefficients in an AEC system looks more like FIG. 3B, with its distinctive initial distribution of near-zero coefficients. As explained earlier, this initial near-zero distribution corresponds to the delay between the emission of sound by the loudspeaker and the capture of sound by the microphone.

While the present example calculates the convergence factor p using the maximum magnitude of the first N samples and the average magnitude of the first M samples, other quantities may also be used. Generally speaking, any quantity indicative of the overall range of coefficient values in a distribution of N samples may be used in place of the maximum magnitude. In addition, any quantity indicative of a typical coefficient value in a distribution of M samples may be used in place of the average magnitude.

Returning once more to FIG. 4, process 400 continues to block 412. Here, the convergence factor p is compared to a threshold. In one example, the value of this threshold is 4. If the convergence factor exceeds the threshold, process 400 continues to block 416 where the step size is decreased. For example, the initial step size may be multiplied by 0.999. If the convergence factor does not exceed the threshold, process 400 continues to block 414 where the step size is increased. For example, the initial step size may be multiplied by 1.01. Although not depicted in FIG. 4, it is also possible to use multiple thresholds, so that step size can be adjusted with varying levels of granularity. In any case, as shown at block 418, the step size may be constrained within a fixed range (e.g., between 0.001 and 0.005). Finally, at block 420, step size controller 160 sends the updated step size to AEC 150.

The updated step size may be used by AEC 150 in the next iteration of the adaptive feedback loop to adjust the AEC coefficients before process 400 starts again. Ultimately, with the addition of step size controller 160, AEC 150 may converge more rapidly and more reliably than otherwise possible, while exhibiting greater resistance to disruptions such as background noise and double talk.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A communications system comprising:
a network connection;
a loudspeaker configured to emit a sound based on a signal received via the network connection;
a microphone located apart from the loudspeaker at a physical distance sufficient to create a first time delay between the emission of the sound by the loudspeaker and a capture of the sound by the microphone; and
a processor configured to:
calculate a plurality of adaptive coefficients associated with an acoustic echo canceller;
calculate a maximum magnitude of a first set of coefficients associated with the acoustic echo canceller among the plurality of adaptive coefficients, wherein a quantity of coefficients in the first set exceeds a quantity of samples captured by the microphone during the first time delay;
calculate an average magnitude of a second set of coefficients associated with the acoustic echo canceller among the plurality of adaptive coefficients, wherein the second set of coefficients is smaller than the first set of coefficients and the second set of coefficients corresponds to samples captured during the first time delay;
determine a ratio between the maximum magnitude of the first set of coefficients and the average magnitude of the second set of coefficients;
perform a comparison between the ratio and a threshold; and
determine an updated step size by increasing or decreasing an initial step size in response to the comparison between the ratio and the threshold.

2. The communications system of claim 1, wherein the communications system is a mobile computing device.

3. The communications system of claim 1, wherein the processor is further configured to adjust at least one coefficient in the plurality of adaptive coefficients using the updated step size.

4. The communications system of claim 1, further comprising:
a buffer configured to create a second time delay by storing signal samples temporarily before they are processed.

5. A method of controlling step size in an acoustic echo canceller, the method comprising:
determining a first statistic based on a first set of coefficients associated with the acoustic echo canceller selected from a plurality of adaptive coefficients used by the acoustic echo canceller;
determining a second statistic based on a second set of coefficients associated with the acoustic echo canceller selected from the plurality of adaptive coefficients, wherein the second set of coefficients is smaller than the first set of coefficients and the second set of coefficients corresponds to samples captured during a time delay created by a physical distance between a microphone and a loudspeaker connected to the acoustic echo canceller;
performing a comparison using the first statistic and the second statistic; and
updating a step size based on the comparison.

6. The method of claim 5, wherein a quantity of coefficients in the first set of coefficients exceeds a quantity of samples captured by the microphone connected to the acoustic echo canceller during the time delay.

7. The method of claim 6, further comprising estimating the time delay or the quantity of samples before determining the first statistic.

8. The method of claim 5, wherein a quantity of coefficients in the first set of coefficients exceeds a quantity of samples held by a buffer configured to delay processing of a signal associated with the acoustic echo canceller.

9. The method of claim 5, wherein the first statistic is determined by calculating a maximum magnitude of the first set of coefficients.

10. The method of claim 5, wherein the second statistic is determined by calculating an average magnitude of the second set of coefficients.

11. The method of claim 5, wherein performing a comparison using the first statistic and the second statistic comprises:
calculating a ratio between the first statistic and the second statistic; and
comparing the ratio to a threshold.

12. The method of claim 11, wherein updating the step size based on the comparison comprises:
decreasing the step size if the ratio is greater than the threshold; and
increasing the step size if the ratio is not greater than the threshold.

13. The method of claim 5, further comprising:
adjusting at least one of the plurality of adaptive coefficients using the updated step size.

14. One or more non-transitory computer-readable storage media comprising computer-executable instructions to:
determine a first statistic based on a first set of coefficients associated with an acoustic echo canceller and selected from a plurality of adaptive coefficients used by the acoustic echo canceller;
determine a second statistic based on a second set of coefficients associated with the acoustic echo canceller and selected from the plurality of adaptive coefficients, wherein the second set of coefficients is smaller than the first set of coefficients and the second set of coefficients corresponds to samples captured during a time delay created by a physical distance between a microphone and a loudspeaker connected to the acoustic echo canceller;
perform a comparison using the first statistic and the second statistic; and
update a step size based on the comparison.

15. The one or more non-transitory computer-readable storage media of claim 14, wherein a quantity of coefficients in the first set of coefficients exceeds a quantity of samples captured by the microphone connected to the acoustic echo canceller during the time delay.

16. The one or more non-transitory computer-readable storage media of claim 15, further comprising computer-executable instructions to estimate the time delay or the quantity of samples before determining the first statistic.

17. The one or more non-transitory computer-readable storage media of claim 14, wherein a quantity of coefficients in the first set of coefficients exceeds a quantity of samples held by a buffer configured to delay processing of a signal associated with the acoustic echo canceller.

18. The one or more non-transitory computer-readable storage media of claim 14, wherein performing the comparison using the first statistic and the second statistic comprises:

calculating a ratio between the first statistic and the second statistic; and comparing the ratio to a threshold.

19. The one or more non-transitory computer-readable storage media of claim 18, wherein updating the step size based on the comparison comprises:

decreasing the step size if the ratio is greater than the threshold; and increasing the step size if the ratio is not greater than the threshold.

20. The one or more non-transitory computer-readable storage media of claim 14, further comprising instructions to:

adjust at least one of the plurality of adaptive coefficients using the updated step size.

* * * * *